UNITED STATES PATENT OFFICE.

WILLIAM J. DANE, OF DETROIT, MICHIGAN.

PAPER-CLEANING COMPOUND.

SPECIFICATION forming part of Letters Patent No. 362,942, dated May 17, 1887.

Application filed August 25, 1886. Serial No. 211,824. (Specimens.)

*To all whom it may concern:*

Be it known that I, WILLIAM J. DANE, a citizen of the United States, residing at Detroit, in the county of Wayne and State of Michigan, have invented a new and useful composition of matter to be used in cleaning wall-paper on walls or ceilings, and especially adapted to remove the discoloration and dirt caused by steam-heating on the paper or walls of a room, of which the following is a specification.

My composition consists of the following ingredients, combined in the proportions stated, viz: granulated cornmeal, (white preferred,) five pounds; wheat-flour, (preferably,) five pounds; water, (soft preferred,) two quarts; sulphuric acid, one-third ounce; alcohol, two ounces; alum, one-half ounce. These ingredients are to be mixed into a stiff dough made into cakes of about six inches in diameter and two inches thick and put into a hot oven, which should be allowed to cool down, leaving the composition about half-baked, as compared with bread for table use. When cool it may be used.

In mixing the compound, the sulphuric acid should first be added to the water, then the alcohol, and lastly the alum, after being dissolved in water, this acidulated water being used in mixing equal parts of the meal and wheat-flour (preferably) into dough. The cakes, if intended to be kept a long time, should be wrapped in tin-foil or its equivalent and kept in a cool place.

When desirous to use, cut the cake in two and rub with the soft part. Draw the stroke, in rubbing in one direction, down or across, but not up and down or around. The compound will take up the dirt perfectly, leaving the paper clean under every stroke, and cleans itself by falling off in crumbles with the dirt attached after every stroke.

I am aware that ordinary bread, semi-dry, and other like compounds have been used for similar purposes; but I am not aware that the four more essential ingredients—viz., granulated cornmeal, wheat-flour, (preferably,) sulphuric acid, and water, (which make a working compound,) either with or without the addition of the improving elements, viz., alcohol and alum—in the proportions stated, or in any proportions, have ever been compounded or used before.

When the granulated cornmeal used is not of a very gritty nature, the alum becomes very essential to the perfect working of the compound, as it imparts a certain hardening as well as dirt-retaining property to the granules, and can be used with great advantage alone dissolved in the water used for mixing the meal and flour, where sulphuric acid and alcohol cannot be had; and while the compound thus made does not leave so bright and perfect a result as the complete compound, yet it is so much better than anything heretofore known or used as to be of great utility.

What I claim, and desire to secure by Letters Patent, is—

1. A composition of matter herein described for the purpose of cleaning wall-paper, composed of granulated cornmeal, wheat-flour, (preferably,) sulphuric acid, and water, in the proportions specified.

2. A composition of matter for cleaning wall-paper, consisting of granulated cornmeal, wheat-flour, (preferably,) sulphuric acid, alcohol, and alum, in the proportions specified.

WILLIAM J. DANE.

Witnesses:
JAMES O'BRIEN,
ISAAC N. PAYNE.